May 12, 1936.    J. BRUECKL    2,040,463
SEAT COVERING DEVICE
Filed April 2, 1935.    2 Sheets-Sheet 2

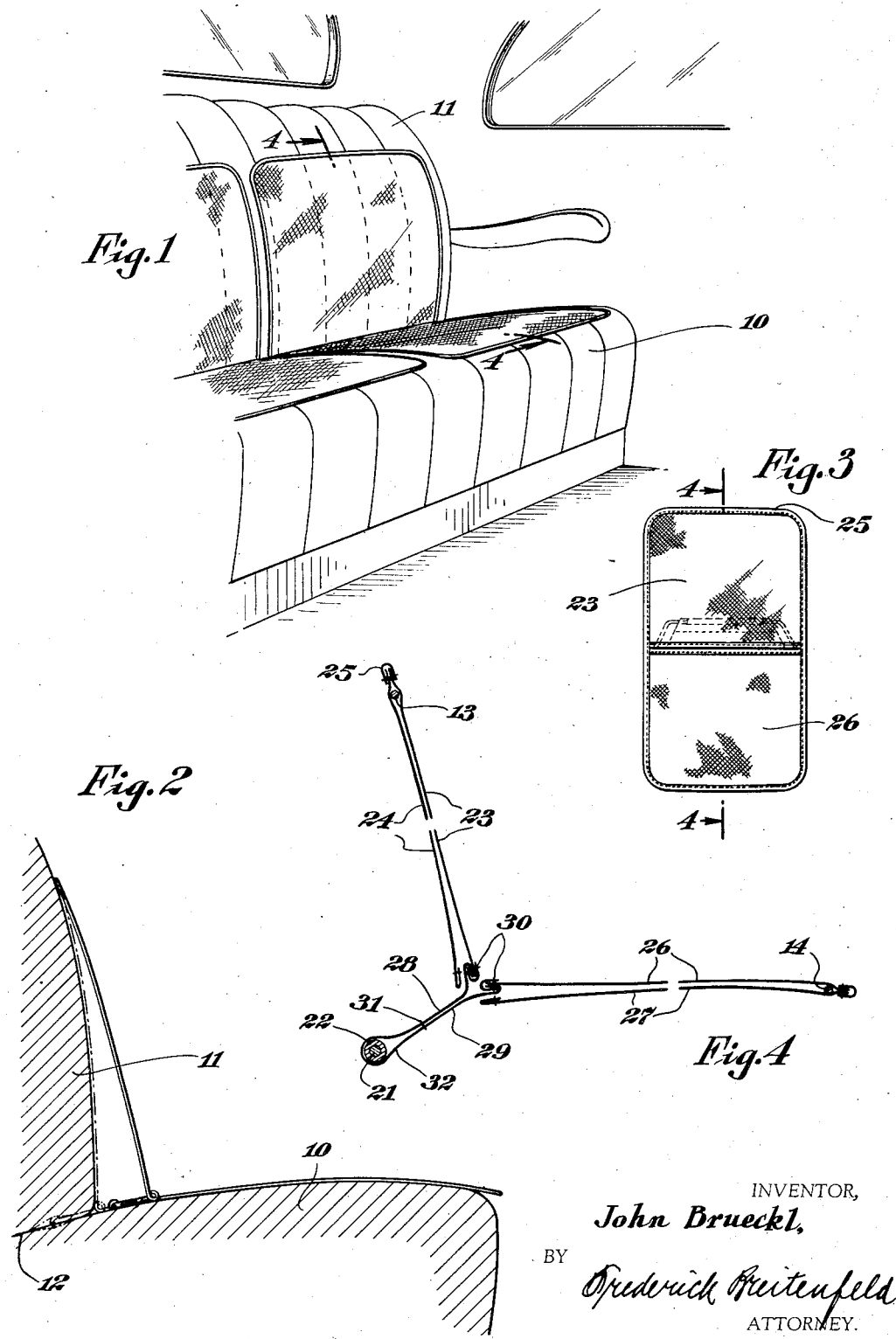

INVENTOR.
John Brueckl,
BY Frederick Breitenfeld
ATTORNEY.

Patented May 12, 1936

2,040,463

UNITED STATES PATENT OFFICE 2,040,463

SEAT COVERING DEVICE

John Brueckl, Union City, N. J.

Application April 2, 1935, Serial No. 14,204

10 Claims. (Cl. 155—182)

My present invention relates generally to seat covering devices.

It is a general object of my invention to provide an improved and simplified device for removable application to upholstered seats of the character used in automotive vehicles, aeroplanes, buses, or the like. In seats of this type, a seat cushion and a back cushion are customarily associated in a manner which provides a crevice between the two. The present invention relates to the type of article which embodies a back section and a base section, hingedly associated, and applicable to the seat to be covered by means of an anchoring device or member which enters into the crevice mentioned.

It is a more specific object of the invention to provide a seat covering device of simplified construction. A preferred embodiment consists of only three simple and relatively inexpensive elements which are capable of mutual assembly.

A further specific object is to provide a device which conforms itself more readily to the seat which is covered thereby, and which is constructed in a special and novel manner so that the back section of the device is held firmly against the back cushion of the seat, and the base section of the device is held firmly against the seat cushion of the seat, this being accomplished without any extraneous fastening elements or the like.

A still further specific object is to provide a device which is of enhanced comfort, and which is adapted to remain firmly in position after it is properly applied to the seat.

One of the characterizing features of my invention lies in the arrangement of the back and base sections at an obtuse angle to each other, in combination with a yieldable spring means which constantly resists a reduction of said angle. As a result, when the device is applied to the seat, a yieldable and constant resilient pressure is exerted upon the base and back sections of the device which maintains them continuously in proper protective disposition over the back cushion and seat cushion of the seat which is covered.

In a preferred embodiment, the present device includes opposed, U-shaped, metal frames which are joined at their ends to form the associated back and seat sections, the spring means being provided in the form of coil springs formed integrally with the frames at the hinge axis.

A further feature of the invention lies in the provision of a novel type of anchoring member, partaking of the form of a U-shaped anchoring rod whose free ends are bent into alignment, these ends being pivotally articulated to the frames at the hinge axis. The base of the anchoring rod is thereby adapted to engage frictionally within the crevice of the seat, and the resultant device is devoid of any uncomfortable or undesirable rigid element against which the body of a person would press or rub.

A still further feature of the invention lies in an arrangement which permits an envelope of suitable covering material to fit snugly over each frame, means being provided for securely holding these envelopes in proper position. More particularly, the present invention provides an extension on one of the walls of each envelope, the extension extending rearwardly from the hinge axis and engaging with the base of the U-shaped anchoring rod.

I achieve the foregoing objects, and such other objects as may hereinafter appear or be pointed out, in the manner illustratively exemplified in the accompanying drawings, wherein—

Figure 1 is a perspective view of a typical seat showing a protective device of the present character in position thereon;

Figure 2 is a cross-sectional view showing the normal disposition of a preferred form of device, and showing the adjustment thereto which holds it in place on the seat;

Figure 3 is a top view of the seat covering device by itself;

Figure 4 is a cross-sectional view taken substantially along the lines 4—4 of Figures 1 and 3;

For purposes of illustration, I have shown the interior of a motor vehicle in which a seat cushion 10 is associated with a back cushion 11 in a manner which provides a crevice 12 between the two. This seat is of the usual upholstered character and is typical of the seats for which my present device is primarily designed.

Figure 5:
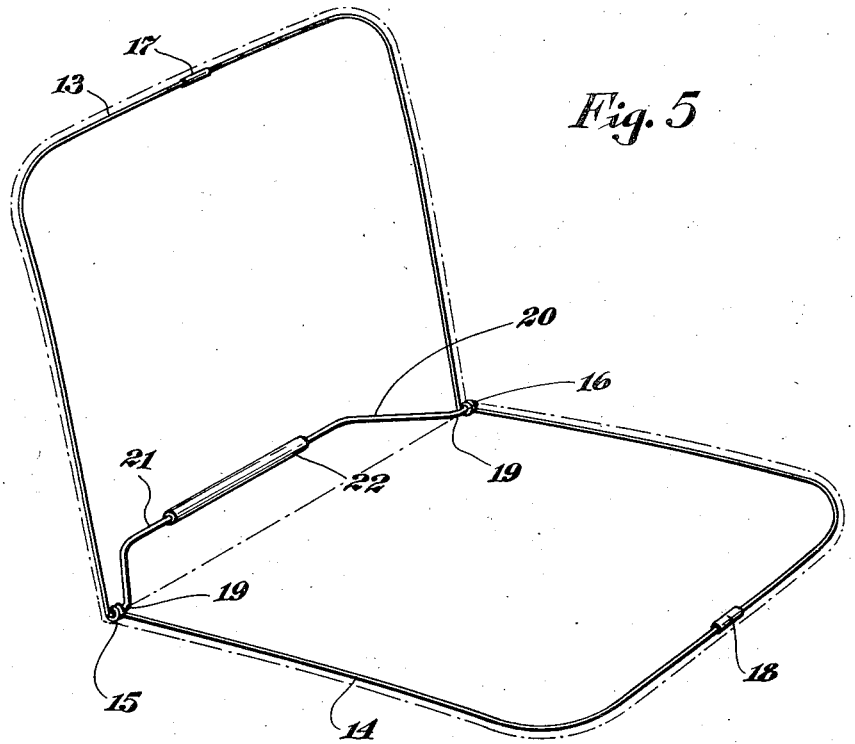
Figure 5 is a perspective view of the device with the envelopes removed.

The preferred form of my present invention includes the elements which are most clearly illustrated in Figure 5. A U-shaped wire frame 13 is arranged in opposed relationship to a similar U-shaped wire frame 14, the free ends being joined to form hingedly associated back and seat sections. Preferably, each arm of each frame is formed integrally with the corresponding arm of the other frame, the wire being spiraled, as at 15 and 16, to form a coil spring. The spiraling is provided in a manner which causes the spring to resist a reduction in the angularity between the two sections or frames. More particularly, the frames are initially manufactured in a manner which disposes the back section at an obtuse angle relative to the base section; and the coil springs at the hinge axis are constructed to resist a reduction in this angularity.

As a manufacturing expedient, I do not construct the U-shaped frame 13 of one piece and the frame 14 of another, but prefer to construct the device of two wire rods which are joined at the points 17 and 18, viz., at the midpoints of the middle portion of each U-shaped frame. This joining may be accomplished in any suitable manner, and I have illustratively shown two small sleeves which are clenched into engagement around the contiguous ends of the two wire elements.

The coil springs 15 and 16 serve a further function in that they define two aligned sockets. These sockets are adapted to receive the outwardly turned ends 19 of the U-shaped anchoring rod 20. The base 21 of this U-shaped element is preferably covered with a small length 22 of rubber tubing or the like, and the arms of the U are preferably disposed at angles which cause them to diverge from the base 21 toward the aligned ends 19.

The anchoring rod 20 is removably applicable to the frame elements. In other words, when the device is initially assembled, the two sockets 15 and 16 are spread slightly and the free ends 19 of the rod 20 are then sprung into position between them.

This framework is then inserted into a pair of envelopes of suitable covering material. Each envelope consists of a forward wall and a rear wall. In Figure 4, for example, it will be observed that the envelope snugly engaging around the frame 13 embodies the forward wall 23 and the rear wall 24, the edges being stitched together in any suitable or desired manner, preferably by the employment of a binding of the character shown at 25. Similarly, the envelope snugly set around the U-shaped frame 14 comprises the upper wall 26 and the lower or rear wall 27. In accordance with my invention, one of the walls of each envelope is provided with an extension. I have illustratively shown an extension 28 attached to the lower edge of the forward wall 23; and I have shown a similar extension 29 attached to the upper or forward wall 26. Each extension is stitched to the wall, as shown at 30, or, if desired, it may be formed integrally with the wall. It is of any desired or suitable fabric or material.

The two extensions extend rearwardly from the hinge axis of the device, are mutually engaged as by the stitching 31, and together they form a transverse loop 32 (open at both ends) which engages around the base 21 of the U-shaped anchoring rod. As illustrated in Figure 4, it is preferable to construct both extensions 28 and 29 of a single strip of material which is doubled upon itself to form the loop 32; which is then stitched transversely as at 31; and which is ultimately secured to the walls 23 and 26 by means of the stitches 30.

In assembling the parts, the U-shaped anchoring rod (disassociated from the frames) is first inserted into the loop 32; the frames 13 and 14 are then pressed into substantially superposed position against the action of the springs 15 and 16; and they are then inserted endwise into their respective envelopes. As soon as they have disposed themselves in the proper positions, as shown in Figure 4, a release of the device permits the springs 15 and 16 to dispose the two sections in the obtuse relationship illustrated in full-lines in Figure 2 and shown also in Figures 4 and 5. The ends of the anchoring rod are then inserted into the sockets 15 and 16. The device is now ready for use, and it is applied to the seat as shown in Figure 2. The full-lines of Figure 2 show the disposition of the device before the springs are stressed. By pressing the hinge axis inwardly toward and into the crevice 12, the anchoring rod is caused to enter snugly and frictionally well into the crevice, and the device is firmly held in this position by means of this frictional engagement. This is indicated by the dot-and-dash lines of Figure 2. The constant tendency of the springs to resist a reduction in angularity between the sections of the device results in imparting a yieldable rearward pressure to the back section and a yieldable down pressure to the base section. This maintained and constant pressure serves to hold the device firmly and reliably in proper position at all times. The only tendency of the device toward a relationship other than that in which it is disposed, when it is in place, is to spring outwardly from the crevice; but this tendency is firmly and reliably overcome by the frictional engagement of the anchoring rod within the crevice of the seat.

The desirable features of the present improved anchoring rod may in themselves be resorted to independently of the features arising from the provision of the resilient spring arrangement. For example, in Figures 6 and 7, I have illustrated the hinge axis of a seat covering device in which a U-shaped frame 33 is articulated to an opposed U-shaped frame 34 by forming loops 35 and 36 on the ends of these frames and mounting the loops upon a stud or pin 37. A nut 38 is in threaded engagement with the pin 37, and by tightening upon the nut 38 the loops 35 and 36 are squeezed together between the head of the stud and the nut 38, and the two frames 33 and 34 are thus held firmly in proper, predetermined, angular relationship.

In such an arrangement, the anchoring rod 20, constructed exactly as hereinbefore described, has its ends 19 disposed within aligned sockets 39 which are rigidly mounted upon the inner end of the opposed pins 37.

Figures 6, 7:
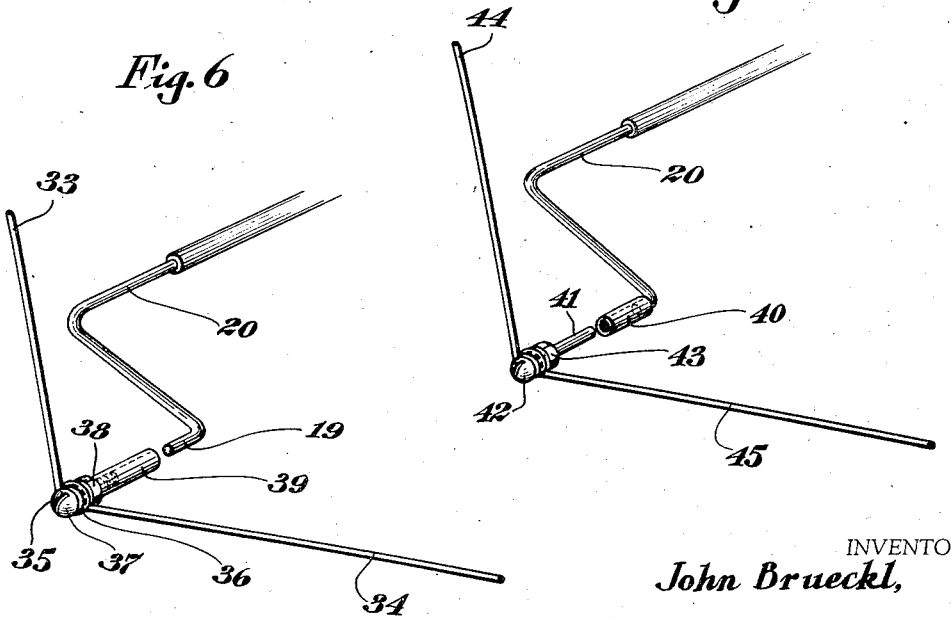
Figure 6 is a fragmentary perspective view illustrating a modification.
Figure 7 is a view similar to Figure 6, illustrating a further modification.

In Figure 7, I show the alternate possibility of providing a socket 40 on each end of the rod 20 and causing this socket to engage over the inner end 41 of a pin 42, the pin 42 being in all other respects similar to the pin 37 and cooperating with the nut 43 to hold the frames 44 and 45 in proper relationship.

An envelope or envelopes, as hereinbefore described, are applied to the frames of Figures 6 or 7, in exactly the same manner as shown in Figure 4, and the loop 32 formed by the two extensions is engaged around the base of the U-shaped anchoring rod, as hereinbefore described. In fact, the only material difference between the constructions of Figures 6 and 7, on the one hand, and Figures 1-5, on the other hand, is in the omission from Figures 6 and 7 of the yieldable spring arrangement at the hinge axis.

It will thus be observed that I have provided a device of extremely inexpensive yet highly efficient character. It adapts itself readily to almost any seat of the character referred to; it is relatively inexpensive to manufacture; it is easy to assemble and disassemble; the envelopes are removable for purposes of replacement or repair or cleaning; the device maintains its proper position at all times without shifting around under the pressure of the body; and there are no undesirable rigid elements exposed to contact with the body.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a seat covering device, a pair of opposed U-shaped frames joined at their ends to form hingedly associated back and seat sections arranged at an obtuse angle to each other, an anchoring rod parallel to the hinge axis and having integral means engaging the frames at the hinge axis for anchoring the device into the crevice between the seat and back cushions of the seat to be covered, and yieldable spring means operatively interposed between said frames at their joined ends for resisting movement of the frames into lesser angularity.

2. In a seat covering device, a pair of opposed U-shaped frames joined at their ends to form hingedly associated back and seat sections arranged at an obtuse angle to each other, each arm of said frames being of spring wire and being integral with the corresponding arm of the other frame, said wire being spiraled to form a coil spring at the hinge axis, said coil springs resisting a reduction in the angularity between said frames, and rigid means pivotally engaging within said springs for anchoring the device into the crevice between the seat and back cushions of the seat to be covered.

3. In a seat covering device, a pair of opposed U-shaped frames joined at their ends to form hingedly associated back and seat sections arranged at an obtuse angle to each other, each arm of said frames being of spring wire and being integral with the corresponding arm of the other frame, said wire being spiraled to form at the hinge axis a coil spring which resists reduction in the angularity between the frames, said springs serving also as aligned sockets, and a rigid anchoring member pivotally mounted within said sockets and adapted to anchor the device into the crevice between the seat and back cushions of the seat to be covered.

4. In a seat covering device, a pair of opposed U-shaped frames joined at their ends to form hingedly associated back and seat sections, a U-shaped anchoring rod having its ends bent into alignment, and means for pivotally articulating said rod ends to said frames at the hinge axis, whereby the base of the anchoring rod will frictionally engage within the crevice between the seat and back cushions of the seat to be covered.

5. In a seat covering device, a pair of opposed U-shaped frames joined at their ends to form hingedly associated back and seat sections, an envelope snugly fitted over each frame, a U-shaped anchoring rod having its ends bent into alignment, means pivotally articulating said rod ends to said frames at the hinge axis, and an extension on one of the walls of each envelope and engaging with the base of said anchoring rod.

6. In a seat covering device, a pair of opposed U-shaped frames joined at their ends to form hingedly associated back and seat sections, an envelope snugly fitted over each frame, a U-shaped anchoring rod having its ends bent into alignment, means pivotally articulating said rod ends to said frames at the hinge axis, the forward wall of each envelope being provided with an extension which engages with the base of said anchoring rod.

7. In a seat covering device, a pair of opposed U-shaped frames joined at their ends to form hingedly associated back and seat sections, an envelope snugly fitted over each frame, a U-shaped anchoring rod having its ends bent into alignment, means pivotally articulating said rod ends to said frames at the hinge axis, the forward wall of each envelope being provided with an extension, said extensions being secured to each other to form a transverse loop which engages around the base of said anchoring rod.

8. In a seat covering device, a pair of opposed U-shaped frames joined at their ends to form hingedly associated back and seat sections, a U-shaped anchoring rod having its ends bent into alignment, and means for pivotally articulating said rod ends to said frames at the hinge axis, said means comprising a pair of sockets carried by said frames and adapted to receive said rod ends, respectively.

9. In a seat covering device, a pair of opposed U-shaped frames joined at their ends to form hingedly associated back and seat sections, a U-shaped anchoring rod having its ends bent into alignment, and means for pivotally articulating said rod ends to said frames at the hinge axis, said means comprising a pair of sockets carried by said rod ends, and pins carried by said frames and accommodated within said sockets, respectively.

10. In a seat covering device, a pair of opposed U-shaped frames joined at their ends to form hingedly associated back and seat sections arranged at an obtuse angle to each other, an envelope snugly fitted over each frame, yieldable spring means operatively interposed between said frames at their joined ends for resisting movement of the frames into lesser angularity, said last-named means comprising a pair of coil springs formed integrally with said frame ends, a U-shaped anchoring rod having its ends bent into alignment and pivotally disposed within said coil springs, and an extension on one of the walls of each envelope engaging with the base of said anchoring rod.

JOHN BRUECKL.